United States Patent [19]

Baden et al.

[11] Patent Number: 5,689,656

[45] Date of Patent: Nov. 18, 1997

[54] DYNAMIC HIERARCHICAL ARBITRATION OF COMPUTER RESOURCE ACCESS REQUESTS

[75] Inventors: Eric A. Baden, Saratoga; Brian A. Childers, Santa Clara, both of Calif.

[73] Assignee: Apple Computer, Inc., Cupertino, Calif.

[21] Appl. No.: 767,118

[22] Filed: Jan. 10, 1997

Related U.S. Application Data

[63] Continuation of Ser. No. 434,182, May 3, 1995, abandoned.
[51] Int. Cl.$^6$ ........................................ G06F 13/00
[52] U.S. Cl. ..................... 395/296; 395/292; 395/729; 395/732
[58] Field of Search ........................ 395/292, 296, 395/729, 732

[56] References Cited

U.S. PATENT DOCUMENTS

| | | |
|---|---|---|
| 5,257,348 | 10/1993 | Roskowski et al. . |
| 5,263,138 | 11/1993 | Wasserman et al. . |
| 5,274,753 | 12/1993 | Roskowski et al. . |
| 5,301,272 | 4/1994 | Atkins . |
| 5,388,228 | 2/1995 | Heath et al. . |

FOREIGN PATENT DOCUMENTS

| | | |
|---|---|---|
| 2 285 726 | 7/1995 | United Kingdom . |
| WO 94/00834 | 1/1994 | WIPO . |

OTHER PUBLICATIONS

*PowerPC 601 RISC Microprocessor User's Manual*, pp. 2–42 through 2–70; 8–1 through 8–36; and 9–1 through 9–52, published by Motorola in 1993.

*PCI Local Bus Specification*, Review Draft Revision 2.1, published Oct. 21, 1994 by the PCI Special Interest Group, P.O. Box 14070, Portland, OR 97214.

*PCI Multimedia Design Guide*, Revision 1.0 (Mar. 29, 1994), which is distributed by the PCI Multimedia Working Group (part of the PCI Special Interest Group, P.O. Box 14070, Portland, OR 97214).

*Primary Examiner*—Jack B. Harvey
*Assistant Examiner*—Jigar Pancholi
*Attorney, Agent, or Firm*—Burns, Doane, Swecker & Mathis, L.L.P.

[57] ABSTRACT

A method of prioritizing computer resource access requests to a shared computer resource, such as a video frame buffer, includes the steps of providing a number, n, of priority schemes in correspondence with a like number of potentially requesting entities, where n is an integer greater than one, and where each priority scheme designates relative priority of the potentially requesting entities with respect to one another. Thus, for each priority scheme there exists one corresponding potentially requesting entity, and a number, n–1, of noncorresponding potentially requesting entities. Next, one of the priority schemes is selected for use as a current priority scheme. A set of currently requesting entities is then determined from the number of potentially requesting entities, and the current priority scheme is used to select a highest priority requesting entity from the set of currently requesting entities. Finally, one of the priority schemes is newly selected as the current priority scheme, wherein the newly selected priority scheme corresponds to the highest priority requesting entity. In one embodiment, at least one of the priority schemes designates a first priority for the corresponding potentially requesting entity, and a second priority for one of the noncorresponding potentially requesting entities, where the first priority is higher than the second priority. In another aspect of the invention, at least one of the potentially requesting entities has a same relative priority designation in at least two of the n priority schemes.

20 Claims, 8 Drawing Sheets

DYNAMIC HIERARCHICAL ARBITRATION OF COMPUTER RESOURCE ACCESS REQUESTS

This application is a continuation of application Ser. No. 08/434,182, filed May 3, 1995, now abandoned.

BACKGROUND

The present invention relates to arbitration of concurrent requests for access to a shared computer resource.

Modern computer systems typically comprise a number of independently operating components, such as a processor and one or more coprocessors, input/output devices, and the like. It is often the case that these independently operating elements compete against one another for access to a shared resource, such as a video frame buffer or other memory device.

To resolve conflicting access requests to a shared resource, a number of arbitration techniques are known. For example, a strategy might be adopted wherein a fixed priority scheme is consulted to resolve all conflicts. That is, given the possibility of concurrently presented access requests from components that will here be labeled "A", "B", "C", "D" and "E", one might define relative priorities, from highest to lowest, as: "A", "B", "C", "D" and "E". Then, when concurrent requests are presented, access to the shared resource is granted to that requesting entity having the highest priority. For example, if concurrent access requests are issued by components "B" and "D", component "B" would win the arbitration.

The above-described fixed priority strategy has the drawback of potentially "locking out" a requesting resource for a long time. Taking the above example for purposes of illustrating this point, if component "B" issues an uninterrupted string of access requests, then component "D" will never win the arbitration because its priority is always lower than that of component "B". This can have very detrimental effects if, for example, resource "D" will start losing data if its access request is not serviced within some predetermined time period.

Figure 1:
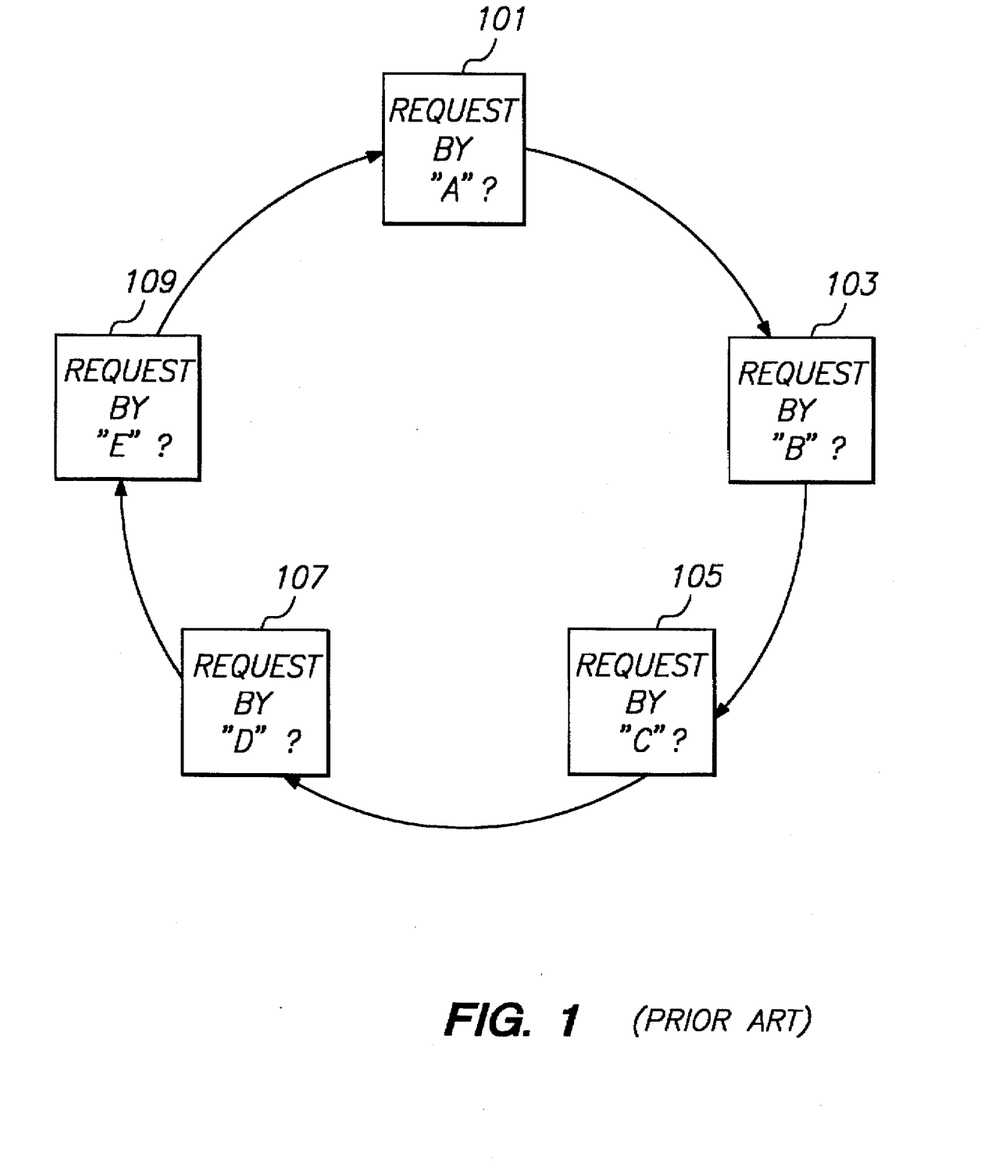
FIG. 1 is a diagram illustrating the principles of a prior art round robin strategy.
Figure 2A:
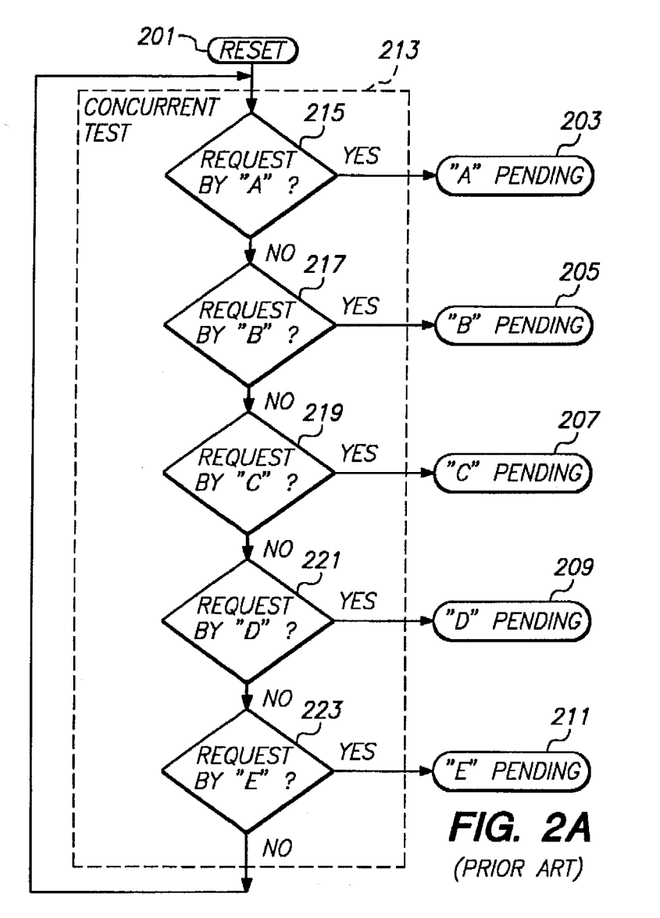
FIGS. 2A–2F are flow charts illustrating a modified prior art round robin strategy, in which polling of all potentially requesting entities is performed concurrently.
Figure 2B:
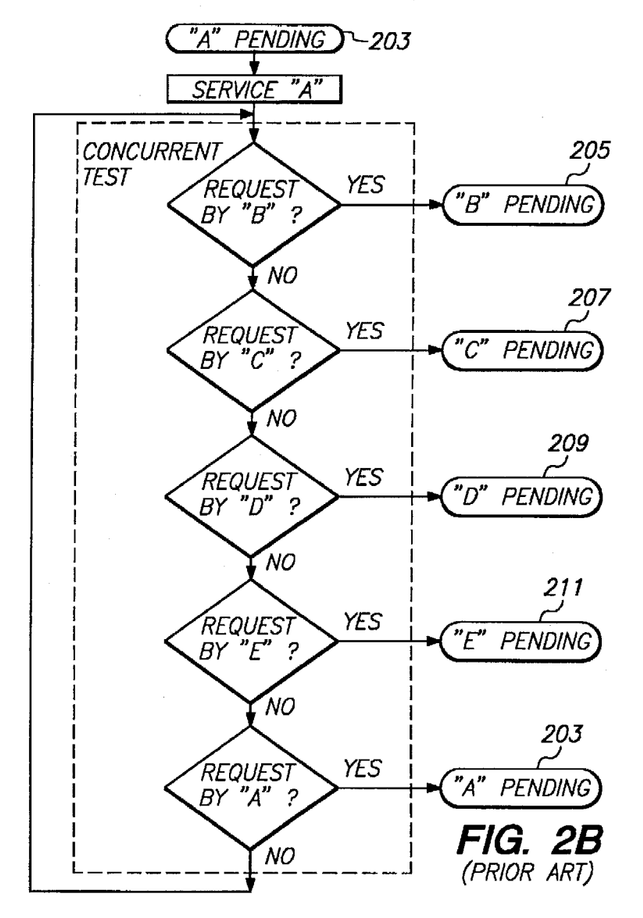
Figure 2C:
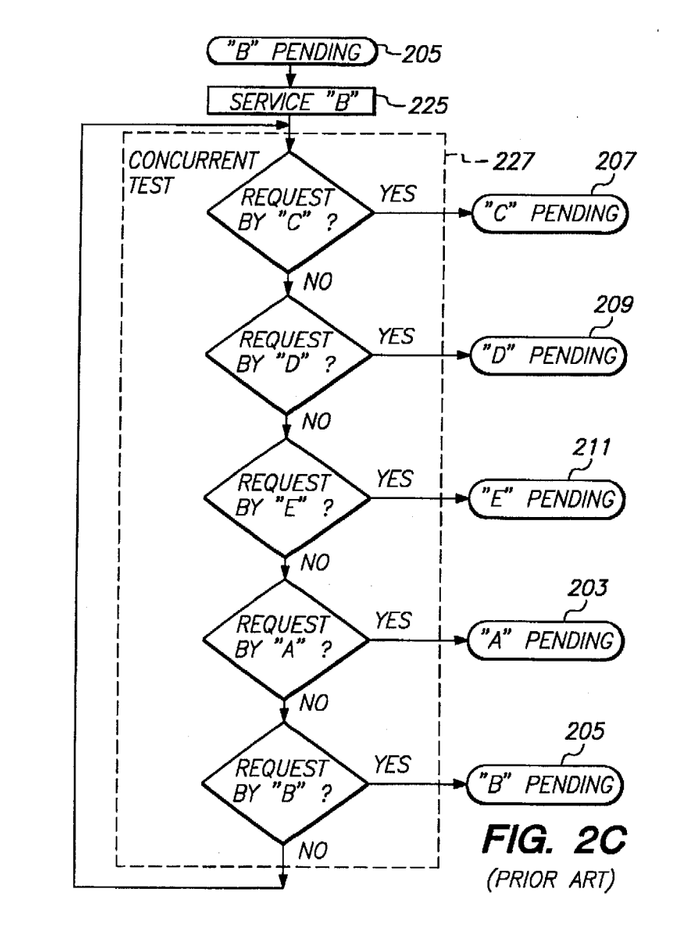
Figure 2D:
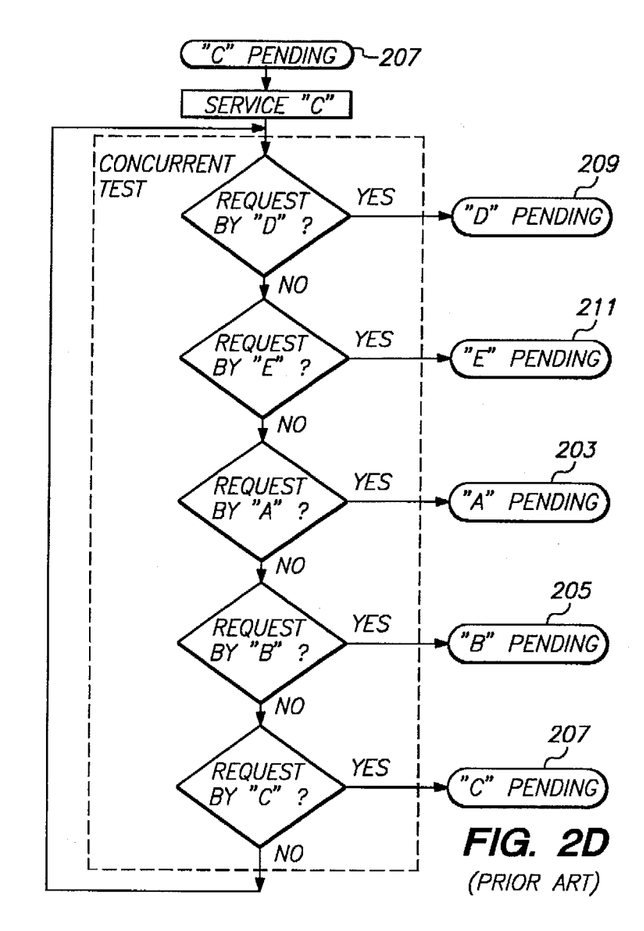
Figure 2E:
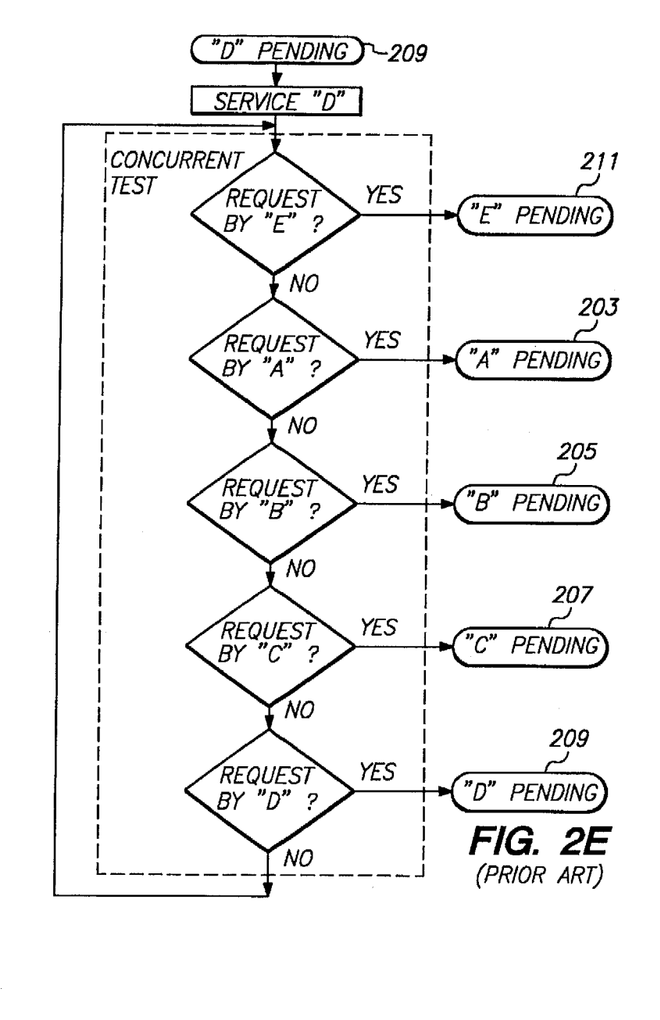
Figure 2F:
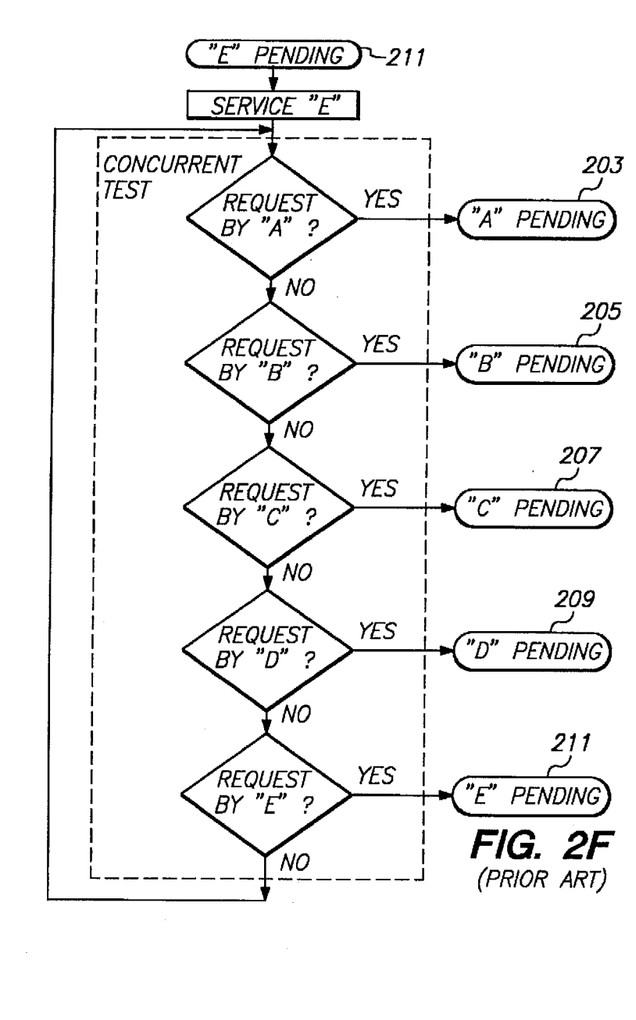

To avoid problems such as that described above, it is known to use an arbitration strategy known as "round robin." This is illustrated in FIG. 1. One might select block 101 as a starting point, and poll to see whether a request by "A" is present. If it is, then component "A" is granted access to the shared resource. Otherwise, polling for pending access requests continues counterclockwise through the blocks 103, 105, 107, 109, 101, 103, . . . until an access request is detected.

A notable feature of the round robin scheme is the fact that after a component's access request is serviced, polling continues with the next block in the sequence, so that no component can be granted access two cycles in a row if another access request is also pending. That is, at the moment of completion of access request servicing, the just serviced resource always has the lowest priority compared to the other possible requesting components. For example, if one assumes that polling begins at block 101, and that components "B" and "D" have both asserted a resource access request, then when polling continues to block 103, "B"'s access request will be detected and serviced. However, even if "B" immediately asserts another access request so as to be co-pending with "D"'s prior request, polling continues by first checking block 105 to see whether "C" has a pending access request. Since it does not in this example, polling continues to block 107, where "D"'s access request is detected and serviced. It can be seen that "B"'s access request will not be serviced until polling returns to block 103.

As described above, the round robin scheme is inefficient because it wastes many clock cycles by checking each resource one at a time. In practice, an improvement can be achieved by concurrently checking for all possible pending access requests, and by changing the priority assignments whenever a request is serviced. This modification is illustrated in FIGS. 2A–2F. For example, if one starts in the reset state 201, the concurrent test represented by block 213 is performed. Although the decision blocks 215, 217, 219, 221, 223 within the concurrent test 213 are shown as being sequential, it should be understood that this is merely to illustrate the priority scheme that will be applied to resolve concurrent resource access requests when in the reset state 201. For example, as soon as component "B" asserts an access request, this will be detected, processing continues at "B Pending" state 205.

At "B Pending" state 205, "B"'s access request is serviced (block 225). Then the concurrent test represented by block 227 is applied. In this case, priority is now in the order "C", "D", "E", "A", "B". Thus, the same priority assignment is achieved as was illustrated by the simpler diagram in FIG. 1. That is, upon returning from being serviced, "B" will have the lowest priority, so that other pending requests cannot be forever locked out.

It can be seen that the round robin approach yields its improvement by dynamically varying the priority scheme that is applied at any given moment. However, it has drawbacks because it is inflexible. That is, the round robin approach, on average, results in an equal access distribution among the possible requesting system components. This may produce undesirable consequences because it fails to take into account the fact that some components may have more demanding requirements than others. For example, if the shared resource is a frame buffer, one of the requesting resources may be a video input device that is supplying pixel data in real time. If it's access request is held off too long, data will be lost. However, the round robin approach may cause an excessive delay by giving equal time to non-time-critical resources, such as a processor that is writing non-real time information to the screen.

SUMMARY

It is therefore an object of the present invention to provide an arbitration strategy that avoids the "lock out" problems associated with fixed priority schemes, while at the same time being flexible enough to account for the particular response time requirements of individual requesting components.

In accordance with one aspect of the present invention, the foregoing and other objects are achieved by an apparatus for use in a system having a shared computer resource, such as a video frame buffer. A method of prioritizing computer resource access requests to the shared computer resource includes the steps of providing a number, n, of priority schemes in correspondence with a like number, n, of potentially requesting entities, wherein n is an integer greater than one, and wherein each priority scheme designates relative priority of the potentially requesting entities with respect to one another. Thus, for each priority scheme there exists one corresponding potentially requesting entity, and a number, n−1, of noncorresponding potentially requesting entities. Next, one of the priority schemes is selected for use as a current priority scheme. A set of currently requesting entities is then determined from the number of potentially requesting entities, and the current priority scheme is used to select a highest priority requesting entity from the set of currently requesting entities. Finally, one of the priority schemes is newly selected as the current priority scheme, wherein the newly selected priority scheme corresponds to the highest priority requesting entity. In one embodiment, at least one of the priority schemes designates a first priority for the corresponding potentially requesting entity, and a second priority for one of the noncorresponding potentially requesting entities, where the first priority is higher than the second priority.

In another aspect of the invention, at least one of the potentially requesting entities has a same relative priority designation in at least two of the n priority schemes.

In general, each of the priority schemes may be tailored to suit the access requirements of each of the potentially requesting entities. Thus, in the present invention, there is no need to give each of the potentially requesting entities an equal opportunity at being granted the shared resource.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

Figure 3:
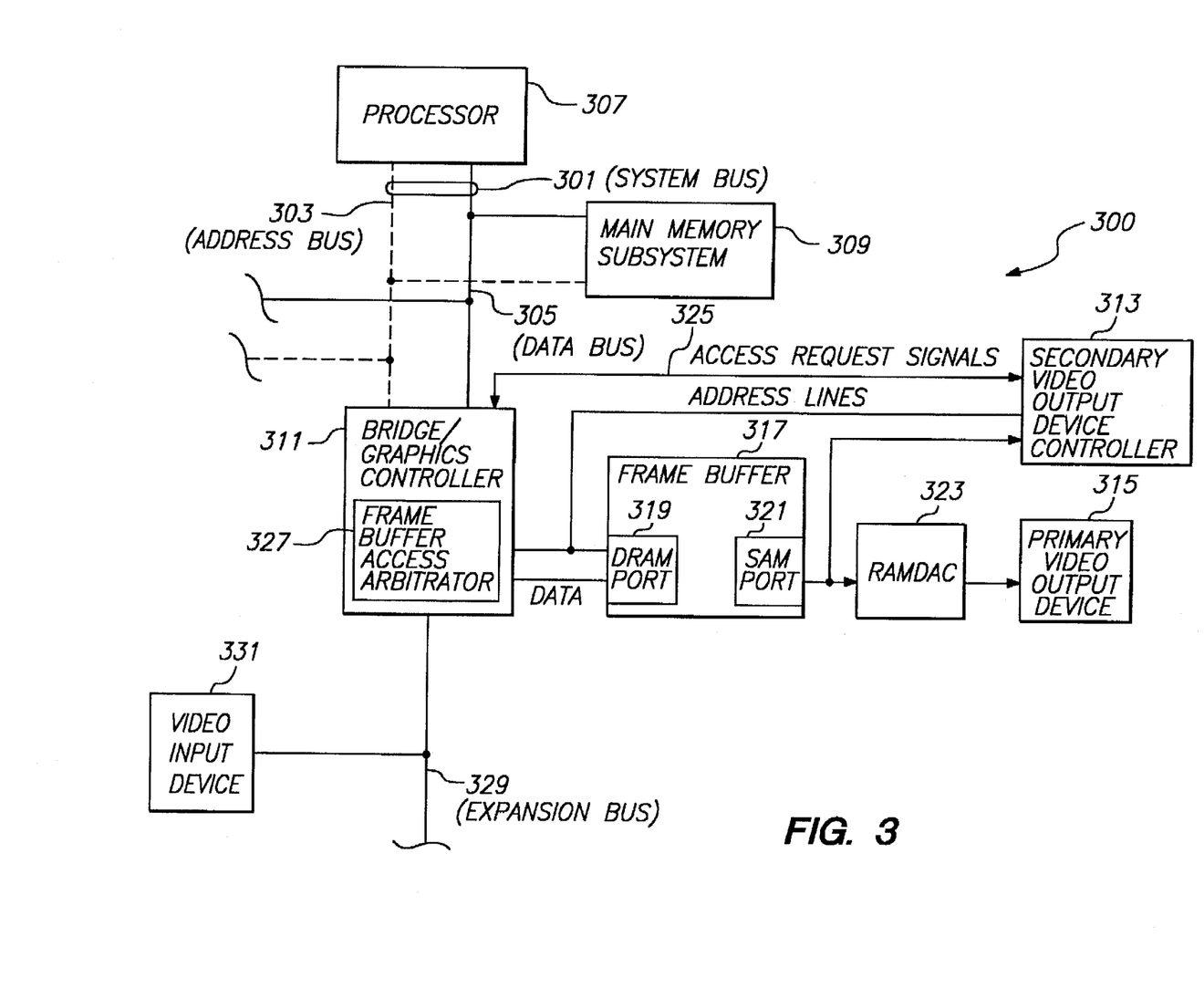
FIG. 3 is a block diagram of a computer system of the type in which the present invention is incorporated.
Figure 4A:
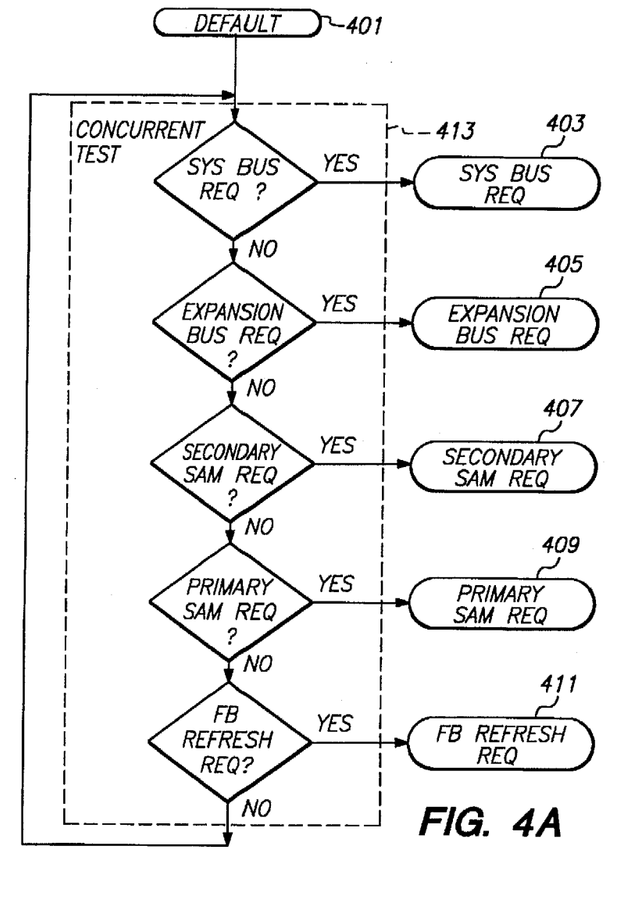
FIGS. 4A–4F are flow charts illustrating the operation of the frame buffer access arbitrator in accordance with the present invention.
Figure 4B:
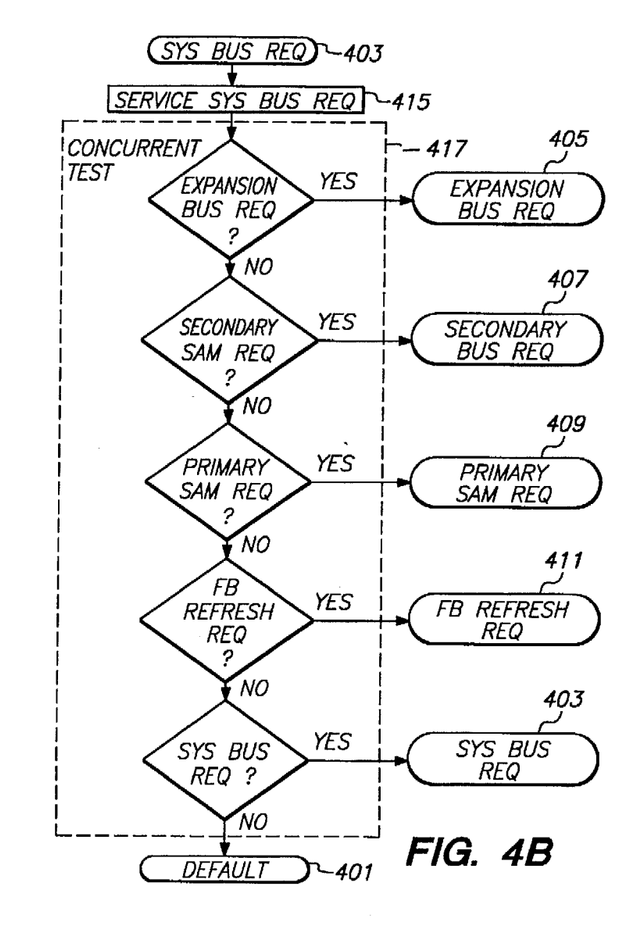
Figure 4C:
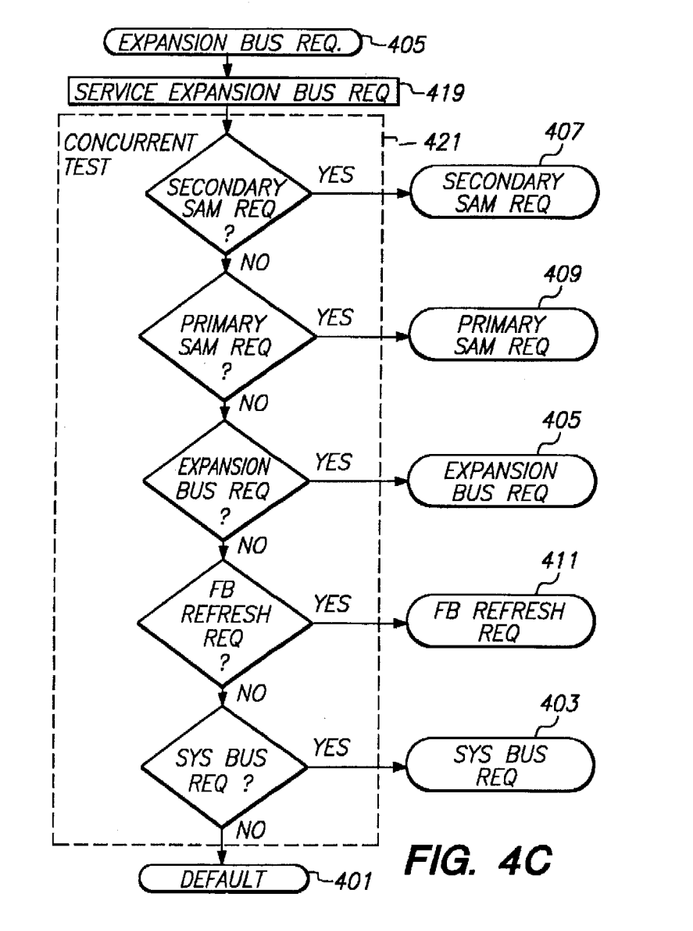
Figure 4D:
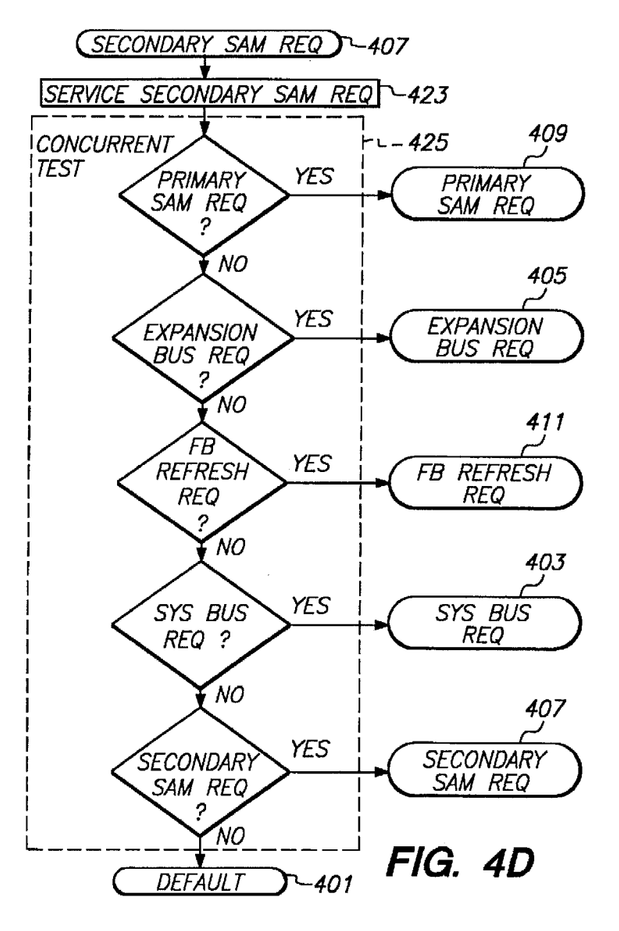
Figure 4E:
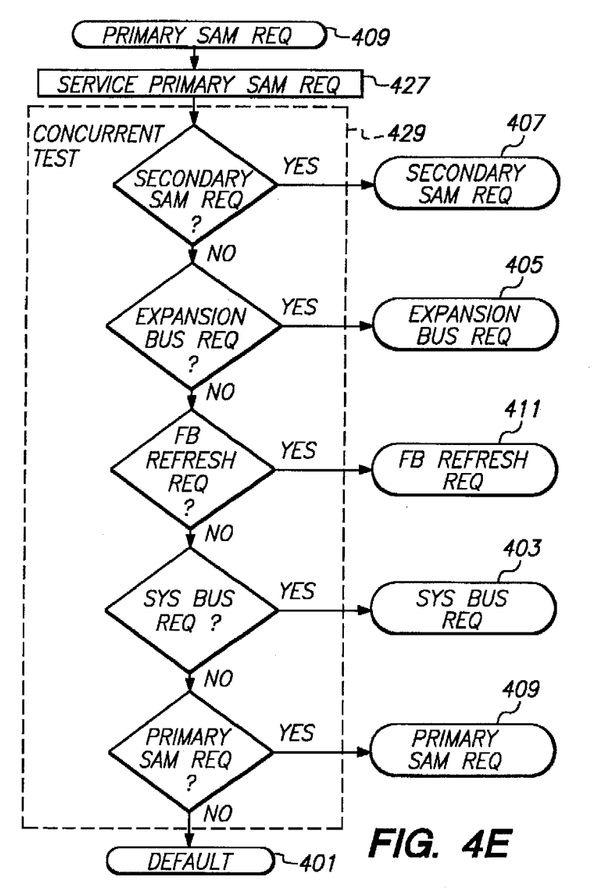
Figure 4F:
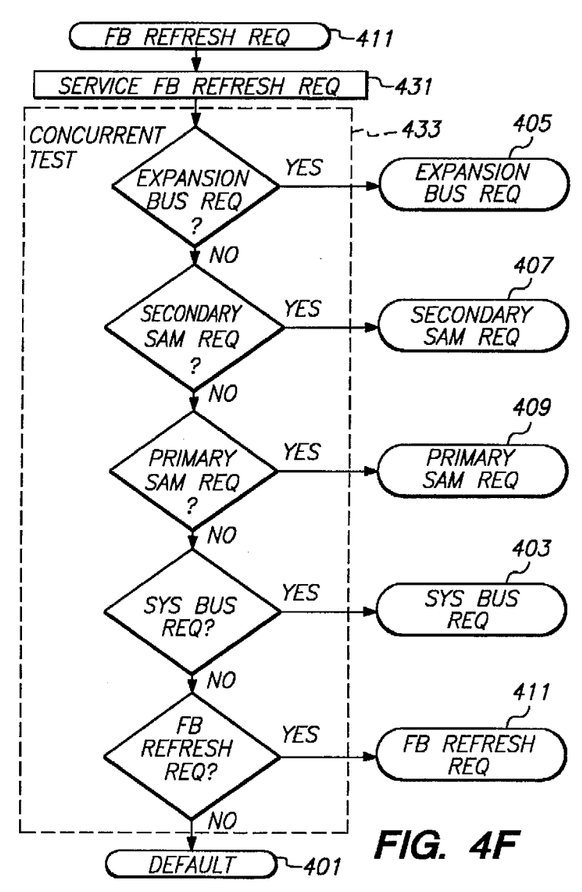

Referring to FIG. 3, the present invention may be used in a computer system 300 of the type shown. The computer system 300 is based on a system bus 301 that comprises an address bus 303 and a data bus 305. Furthermore, the system bus 301 is of a loosely coupled type that has split-bus transaction capability. A bus of this type is described in the *PowerPC 601 RISC Microprocessor User's Manual*, published by Motorola in 1993, and also in U.S. patent application Ser. No. 08/432,620, which was filed by James Kelly et al. on May 2, 1995, and entitled BUS TRANSACTION REORDERING USING SIDE-BAND INFORMATION SIGNALS. Both the *PowerPC 601 RISC Microprocessor User's Manual* and U.S. patent application Ser. No. 08/432, 620 are incorporated herein by reference.

Attached to the system bus 301 is a processor 307, such as the PowerPC™ 601 microprocessor, that is capable of operating in a split-bus transaction environment. For purposes of simplifying the drawing, also attached to the system bus 301 is a block designated as main memory subsystem 309. Those having ordinary skill in the art will appreciate that the main memory subsystem 309 may comprise any combination of static or dynamic random access memory (SRAM or DRAM) as well as read only memory (ROM) and cache memory. For further simplification of the drawing, the main memory subsystem 309 also includes arbitration logic for resolving conflicting access requests made to the address and data buses 303, 305. A more detailed description of these features, which are well-known in the art, is beyond the scope of this disclosure.

In the exemplary system 300, image data is displayed on a primary video output device 315, which may be, for example, an analog RGB monitor. An image to be displayed is stored in a frame buffer 317 as a set of pixels, the form of which may be in accordance with any of a number of well-known pixel formats, such as RGB and YUV. The frame buffer 317 is a video random access memory (VRAM) which is a special type of dynamic RAM (DRAM) that has a DRAM port 319 and a serial access memory (SAM) port 321, each for accessing the pixel data stored in the frame buffer 317. The SAM port 321 is connected to a RAMDAC 323, which reads the serial stream of pixel data from the frame buffer 317, and converts the digital bit stream into appropriate analog signals for driving the primary video output device 315.

A combination bridge/graphics controller 311 is provided, which has an interface for connection to the system bus 301, and another interface for connection to the DRAM port 319 of the frame buffer 317. One function of the bridge/graphics controller 311 is to receive frame buffer access requests from the system bus 301 and provide these to the frame buffer 317 for servicing.

Another purpose of the bridge/graphics controller 311 is to provide a path from an expansion bus 329 to the frame buffer 317. In a preferred embodiment, the expansion bus is a well-known standardized bus known as PCI. In this example, a video input device 331, which is connected to the expansion bus 329, supplies pixel data that needs to be written to the frame buffer 317 in real time.

To help explain the inventive arbitration scheme still further, the exemplary system 300 is also shown to include a secondary video output device controller 313, which may generate signals for an NTSC/PAL monitor. The secondary video output device controller 313 also needs to be able to access the frame buffer 317, so it presents its access request signals 325 to the bridge/graphics controller 311.

In addition to the frame buffer access requests through the DRAM port 319 as described above, it is noted that both the primary video output device 315 and the secondary video output device controller 313 will periodically require access to the frame buffer 317 in order to load the SAM. Furthermore, since the frame buffer 317 is preferably constructed from a DRAM, periodic memory refresh operations need to be performed.

It can be seen from the above that, in this example, it is possible for five frame buffer access requests to be asserted simultaneously. These are: 1) system bus request, 2) expansion bus request, 3) secondary SAM request (i.e., the request from the secondary video output device controller to load the SAM with desired pixel data), 4) primary SAM request (i.e., the request for pixel data to be loaded into the SAM for purposes of being displayed on the primary video output device 315), and 5) a frame buffer refresh request. To resolve conflicting requests for access to the frame buffer 317 while satisfying the latency requirements for each potentially requesting entity to ensure a high level of performance, the bridge/graphics controller includes a frame buffer access arbitrator 327, which is constructed in accordance with the present invention.

The operation of the frame buffer access arbitrator 327 will now be described with reference to the flow charts of FIGS. 4A–4F. The frame buffer access arbitrator operates in any one of six possible states, which are described as follows:

1) DEFAULT state 401: The frame buffer 317 is currently idle, and is available to accept an access request;
2) SYS BUS REQ state 403: The frame buffer 317 is currently servicing a frame buffer access request that arrived from the system bus 301 (e.g., from the processor 307);
3) EXPANSION BUS REQ state 405: The frame buffer 317 is currently servicing a frame buffer access request that arrived from the expansion bus 329 (e.g., from the video input device 331);
4) SECONDARY SAM REQ state 407: The frame buffer 317 is currently servicing a frame buffer access request that was made by the secondary video output device controller 313 for the purpose of causing the SAM to be loaded with pixel data (which is then available at the SAM port 321) from the frame buffer storage;
5) PRIMARY SAM REQ state 409: The frame buffer 317 is currently servicing a frame buffer access request that was made for the purpose of causing the SAM to be loaded with pixel data (which is then available at the SAM port 321) from the frame buffer storage for display on the primary video output device 315; and
6) FB REFRESH REQ state 411: The DRAM within the frame buffer 317 is currently undergoing a refresh operation.

In accordance with the present invention, each of the above six states is associated with a corresponding set of request priorities that are tailored to not only avoid the "lock out" problem described in the BACKGROUND section above, but also to grant access to some requesting components more frequently than others, in order to ensure that latency and bandwidth requirements are met. Thus, the priorities do not merely result from a circular shift of a never-changing sequence, as is the case with the prior art round robin scheme. Furthermore, the present invention places no restrictions on the allowable priorities in any given state. For example, in contrast to the round robin scheme, it is perfectly acceptable to designate a non-lowest priority to a requestor whose prior request has just concluded. This may be necessary to avoid losing data being received in real time, and may be possible without detrimentally affecting those requestors having a lower designated priority.

Moreover, in accordance with the present invention, a given requestor may be assigned the same relative priority in more than one state. This is in sharp contrast to round robin schemes, in which for n states that correspond to n requestors, it is always the case that each requestor is assigned a different relative priority in each of the n states.

For the exemplary system 300 shown in FIG. 3, the flow charts of FIGS. 4A–4F show preferred priority assignments as follows:

1) In DEFAULT state 401, highest to lowest priorities are:
SYS BUS REQ;
EXPANSION BUS REQ;
SECONDARY SAM REQ;
PRIMARY SAM REQ; and
FB REFRESH REQ.
These assignments are applied in a concurrent test of all possible access requests (step 413). In the absence of any pending requests, the frame buffer access arbitrator remains in DEFAULT state 401.

2) In SYS BUS REQ state 403, highest to lowest priorities are:
EXPANSION BUS REQ;
SECONDARY SAM REQ;
PRIMARY SAM REQ;
FB REFRESH REQ; and
SYS BUS REQ.
After servicing the current system bus request (step 415), the above assignments are applied in a concurrent test of all possible access requests (step 417). In the absence of any pending requests, the frame buffer access arbitrator returns to the DEFAULT state 401.

3) In EXPANSION BUS REQ state 405, highest to lowest priorities are:
SECONDARY SAM REQ;
PRIMARY SAM REQ;
EXPANSION BUS REQ (note the departure from the round robin scheme here, which would otherwise require that EXPANSION BUS REQ be assigned the lowest priority while in EXPANSION BUS REQ state 405);
FB REFRESH REQ; and
SYS BUS REQ.
After servicing the current expansion bus request (step 419), the above assignments are applied in a concurrent test of all possible access requests (step 421). In the absence of any pending requests, the frame buffer access arbitrator returns to the DEFAULT state 401.

4) In SECONDARY SAM REQ state 407, highest to lowest priorities are:
PRIMARY SAM REQ;
EXPANSION BUS REQ;
FB REFRESH REQ;
SYS BUS REQ; and
SECONDARY SAM REQ.
After servicing the current expansion bus request (step 423), the above assignments are applied in a concurrent test of all possible access requests (step 425). In the absence of any pending requests, the frame buffer access arbitrator returns to the DEFAULT state 401.

5) In PRIMARY SAM REQ state 409, highest to lowest priorities are:
SECONDARY SAM REQ;
EXPANSION BUS REQ;
FB REFRESH REQ;
SYS BUS REQ; and
PRIMARY SAM REQ.
After servicing the current expansion bus request (step 427), the above assignments are applied in a concurrent test of all possible access requests (step 429). In the absence of any pending requests, the frame buffer access arbitrator returns to the DEFAULT state 401.

6) In FB REFRESH REQ state 411, highest to lowest priorities are:
EXPANSION BUS REQ;
SECONDARY SAM REQ;
PRIMARY SAM REQ;
SYS BUS REQ; and
FB REFRESH REQ.
After servicing the current expansion bus request (step 427), the above assignments are applied in a concurrent test of all possible access requests (step 429). In the absence of any pending requests, the frame buffer access arbitrator returns to the DEFAULT state 401.

Several observations may be made about the priority assignments illustrated in FIGS. 4A–4F. First, the relative priority that is assigned to a request by the expansion bus while in expansion bus request state 405 is not last, as would be expected in a round robin strategy, but is instead third. This is because the expansion bus 329 is expected to convey real time video data which has very severe latency requirements which preclude it from being held off for too long. Since requestors such as the system bus 301 and the frame buffer 317 (for refresh) can more easily tolerate a longer latency, and further because it is known that the expansion bus requests are intermittent (so that expansion bus requests cannot be made every cycle without interruption), the inventive priority strategy assigns the expansion bus request a higher relative priority even though a previous expansion bus request has Just completed being serviced.

It is further observed that a number of potentially requesting entities are each assigned the same relative priority in two or more states. For example, the expansion bus request is assigned the highest priority twice: in both SYS BUS REQ state 403 and in FB REFRESH REQ state 411; the secondary SAM request is assigned the highest priority twice: in EXPANSION BUS REQ state 405 and in PRIMARY SAM REQ state 409; the system bus request is assigned the fourth priority three times: once in SECONDARY SAM REQ state 407, once in PRIMARY SAM REQ state 409, and once in FB REFRESH REQ state 403. Other instances of a requesting entity being assigned the same relative priority in two or more states can also be found in FIGS. 4A–4F.

Assigning priorities in this manner can create the appearance of potential "lock out" situations. For example, if each of the primary and secondary SAM requesting entities were actually to make a request during each clock cycle, then a situation could exist in which the states toggled unendingly back and forth between SECONDARY SAM REQ state 407 and PRIMARY SAM REQ state 409, since in each of these states the other state is given highest priority. However, because it is known that these requests do not, in practice, occur with this regularity, the designer may safely make the priority assignments as shown.

A preferred priority assignment scheme has been described with reference to a particular system environment. In general, the relative priority assignments within each of the states will vary for different systems. Factors that a designer needs to consider in order to produce a balanced arbitration strategy include latency requirements associated with some or all of the potentially requesting entities, different bandwidth requirements for the potentially requesting entities, and overall system performance requirements.

The invention has been described with reference to a particular embodiment. However, it will be readily apparent to those skilled in the art that it is possible to embody the invention in specific forms other than those of the preferred embodiment described above. This may be done without departing from the spirit of the invention. For example, the arbitration scheme described here may be applied to systems having greater or fewer numbers of possible requesting devices. Furthermore, the types of requesting devices may differ from those shown here. Additionally, the shared resource need not be a frame buffer, but may alternatively be any other type of system resource for which requests may be made.

Accordingly, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of prioritizing computer resource access requests, comprising the steps of:

providing a number, n, of priority schemes in correspondence with a like number, n, of potentially requesting entities, wherein n is an integer greater than one, wherein each priority scheme designates relative priority of the potentially requesting entities with respect to one another, and whereby for each priority scheme there exists one corresponding potentially requesting entity, and a number, n−1, of noncorresponding potentially requesting entities;

selecting one of the priority schemes as a current priority scheme;

determining a set of currently requesting entities from the number of potentially requesting entities;

using the current priority scheme to select a highest priority requesting entity from the set of currently requesting entities and designating the selected highest priority requesting entity as the next requesting entity to be serviced; and newly selecting one of the priority schemes as the current priority scheme for use in selecting a subsequent highest priority requesting entity, wherein the newly selected priority scheme corresponds to the highest priority requesting entity, wherein at least one of the priority schemes designates a first priority for the corresponding potentially requesting entity, and a second priority for one of the noncorresponding potentially requesting entities, the first priority being higher than the second priority.

2. The method of claim 1, further comprising the step of providing a default priority scheme that designates relative priority of the potentially requesting entities with respect to one another, and wherein the step of newly selecting one of the priority schemes as the current priority scheme further comprises selecting the default priority scheme as the current priority scheme whenever none of the potentially requesting entities are currently making requests.

3. The method of claim 1, wherein:

the computer resource is a video frame buffer having a serial access mode (SAM) port; and the potentially requesting entities include a system bus requestor, an expansion bus requestor, a video frame buffer refresh requestor, a primary SAM requestor and a secondary SAM requestor.

4. The method of claim 3, wherein:

the step of providing the priority schemes includes providing first, second, third, fourth and fifth priority schemes in correspondence with, respectively, the system bus requestor, the expansion bus requestor, the primary SAM requestor, the secondary SAM requestor and the video frame buffer refresh requestor;

the first priority scheme designates, in the order of highest to lowest priority, the following relative priorities: the expansion bus requestor, the secondary SAM requestor, the primary SAM requestor, the video frame buffer refresh requestor and the system bus requestor;

the second priority scheme designates, in the order of highest to lowest priority, the following relative priorities: the secondary SAM requestor, the primary SAM requestor, the expansion bus requestor, the video frame buffer refresh requestor and the system bus requestor;

the third priority scheme designates, in the order of highest to lowest priority, the following relative priorities: the secondary SAM requestor, the expansion bus requestor, the video frame buffer refresh requestor, the system bus requestor and the primary SAM requestor;

the fourth priority scheme designates, in the order of highest to lowest priority, the following relative priorities: the primary SAM requestor, the expansion bus requestor, the video frame buffer refresh requestor, the system bus requestor and the secondary SAM requestor; and the fifth priority scheme designates, in the order of highest to lowest priority, the following relative priorities: the expansion bus requestor, the secondary SAM requestor, the primary SAM requestor, the system bus requestor and the video frame buffer refresh requestor.

5. The method of claim 4, further comprising the step of providing a default priority scheme that designates relative priority of the potentially requesting entities with respect to one another, and wherein:

the step of newly selecting one of the priority schemes as the current priority scheme further comprises selecting the default priority scheme as the current priority scheme whenever none of the potentially requesting entities are currently making requests; and the default priority scheme designates, in the order of highest to lowest priority, the following relative priorities: the system bus requestor, the expansion bus requestor, the secondary SAM requestor, the primary SAM requestor and the video frame buffer refresh requestor.

6. An apparatus for prioritizing computer resource access requests, comprising:

means for providing a number, n, of priority schemes in correspondence with a like number, n, of potentially requesting entities, wherein n is an integer greater than one, wherein each priority scheme designates relative priority of the potentially requesting entities with respect to one another, and whereby for each priority scheme there exists one corresponding potentially requesting entity, and a number, n−1, of noncorresponding potentially requesting entities;

means for selecting one of the priority schemes as a current priority scheme;

means for determining a set of currently requesting entities from the number of potentially requesting entities;

means for using the current priority scheme to select a highest priority requesting entity from the set of currently requesting entities and designating the selected highest priority requesting entity as the next requesting entity to be serviced; and means for newly selecting one of the priority schemes as the current priority scheme for use in selecting a subsequent highest priority requesting entity, wherein the newly selected priority scheme corresponds to the highest priority requesting entity, wherein at least one of the priority schemes designates a first priority for the corresponding potentially requesting entity, and a second priority for one of the noncorresponding potentially requesting entities, the first priority being higher than the second priority.

7. The apparatus of claim 6, further comprising means for providing a default priority scheme that designates relative priority of the potentially requesting entities with respect to one another, and wherein the means for newly selecting one of the priority schemes as the current priority scheme further comprises means for selecting the default priority scheme as the current priority scheme whenever none of the potentially requesting entities are currently making requests.

8. The apparatus of claim 6, wherein:

the computer resource is a video frame buffer having a serial access mode (SAM) port; and the potentially requesting entities include a system bus requestor, an expansion bus requestor, a video frame buffer refresh requestor, a primary SAM requestor and a secondary SAM requestor.

9. The apparatus of claim 8, wherein:

the means for providing the priority schemes includes means for providing first, second, third, fourth and fifth priority schemes in correspondence with, respectively, the system bus requestor, the expansion bus requestor, the primary SAM requestor, the secondary SAM requestor and the video frame buffer refresh requestor;

the first priority scheme designates, in the order of highest to lowest priority, the following relative priorities: the expansion bus requestor, the secondary SAM requestor, the primary SAM requestor, the video frame buffer refresh requestor and the system bus requestor;

the second priority scheme designates, in the order of highest to lowest priority, the following relative priorities: the secondary SAM requestor, the primary SAM requestor, the expansion bus requestor, the video frame buffer refresh requestor and the system bus requestor;

the third priority scheme designates, in the order of highest to lowest priority, the following relative priorities: the secondary SAM requestor, the expansion bus requestor, the video frame buffer refresh requestor, the system bus requestor and the primary SAM requestor;

the fourth priority scheme designates, in the order of highest to lowest priority, the following relative priorities: the primary SAM requestor, the expansion bus requestor, the video frame buffer refresh requestor, the system bus requestor and the secondary SAM requestor; and the fifth priority scheme designates, in the order of highest to lowest priority, the following relative priorities: the expansion bus requestor, the secondary SAM requestor, the primary SAM requestor, the system bus requestor and the video frame buffer refresh requestor.

10. The apparatus of claim 9, further comprising means for providing a default priority scheme that designates relative priority of the potentially requesting entities with respect to one another, and wherein:

the means for newly selecting one of the priority schemes as the current priority scheme further comprises means for selecting the default priority scheme as the current priority scheme whenever none of the potentially requesting entities are currently making requests; and the default priority scheme designates, in the order of highest to lowest priority, the following relative priorities: the system bus requestor, the expansion bus requestor, the secondary SAM requestor, the primary SAM requestor and the video frame buffer refresh requestor.

11. A method of prioritizing computer resource access requests, comprising the steps of:

providing a number, n, of priority schemes in correspondence with a like number, n, of potentially requesting entities, wherein n is an integer greater than one, wherein each priority scheme designates relative priority of the potentially requesting entities with respect to one another, and wherein at least one of the potentially requesting entities has a same relative priority designation in at least two of the n priority schemes;

selecting one of the priority schemes as a current priority scheme;

determining a set of currently requesting entities from the number of potentially requesting entities;

using the current priority scheme to select a highest priority requesting entity from the set of currently requesting entities and designating the selected highest priority requesting entity as the next requesting entity to be serviced; and newly selecting one of the priority schemes as the current priority scheme for use in selecting a subsequent highest priority requesting entity, wherein the newly selected priority scheme corresponds to the highest priority requesting entity.

12. The method of claim 11, further comprising the step of providing a default priority scheme that designates relative priority of the potentially requesting entities with respect to one another, and wherein the step of newly selecting one of the priority schemes as the current priority scheme further comprises selecting the default priority scheme as the current priority scheme whenever none of the potentially requesting entities are currently making requests.

13. The method of claim 11, wherein:

the computer resource is a video frame buffer having a serial access mode (SAM) port; and the potentially requesting entities include a system bus requestor, an expansion bus requestor, a video frame buffer refresh requestor, a primary SAM requestor and a secondary SAM requestor.

14. The method of claim 13, wherein:

the step of providing priority schemes includes providing first, second, third, fourth and fifth priority schemes in correspondence with, respectively, the system bus requestor, the expansion bus requestor, the primary SAM requestor, the secondary SAM requestor and the video frame buffer refresh requestor;

the first priority scheme designates, in the order of highest to lowest priority, the following relative priorities: the expansion bus requestor, the secondary SAM requestor, the primary SAM requestor, the video frame buffer refresh requestor and the system bus requestor;

the second priority scheme designates, in the order of highest to lowest priority, the following relative priorities: the secondary SAM requestor, the primary SAM requestor, the expansion bus requestor, the video frame buffer refresh requestor and the system bus requestor;

the third priority scheme designates, in the order of highest to lowest priority, the following relative priorities: the secondary SAM requestor, the expansion bus requestor, the video frame buffer refresh requestor, the system bus requestor and the primary SAM requestor;

the fourth priority scheme designates, in the order of highest to lowest priority, the following relative priorities: the primary SAM requestor, the expansion bus requestor, the video frame buffer refresh requestor, the system bus requestor and the secondary SAM requestor; and the fifth priority scheme designates, in the order of highest to lowest priority, the following relative priorities: the expansion bus requestor, the secondary SAM requestor, the primary SAM requestor, the system bus requestor and the video frame buffer refresh requestor.

15. The method of claim 14, further comprising the step of providing a default priority scheme that designates relative priority of the potentially requesting entities with respect to one another, and wherein:

the step of newly selecting one of the priority schemes as the current priority scheme further comprises selecting the default priority scheme as the current priority scheme whenever none of the potentially requesting entities are currently making requests; and the default priority scheme designates, in the order of highest to lowest priority, the following relative priorities: the system bus requestor, the expansion bus requestor, the secondary SAM requestor, the primary SAM requestor and the video frame buffer refresh requestor.

16. An apparatus for prioritizing computer resource access requests, comprising:

means for providing a number, n, of priority schemes in correspondence with a like number, n, of potentially requesting entities, wherein n is an integer greater than one, wherein each priority scheme designates relative priority of the potentially requesting entities with respect to one another, and wherein at least one of the potentially requesting entities has a same relative priority designation in at least two of the n priority schemes;

means for selecting one of the priority schemes as a current priority scheme;

means for determining a set of currently requesting entities from the number of potentially requesting entities;

means for using the current priority scheme to select a highest priority requesting entity from the set of currently requesting entities and designating the selected highest priority requesting entity as the next requesting entity to be serviced; and means for newly selecting one of the priority schemes as the current priority scheme for use in selecting a subsequent highest priority requesting entity, wherein the newly selected priority scheme corresponds to the highest priority requesting entity.

17. The apparatus of claim 16, further comprising means for providing a default priority scheme that designates relative priority of the potentially requesting entities with respect to one another, and wherein the means for newly selecting one of the priority schemes as the current priority scheme further comprises means for selecting the default priority scheme as the current priority scheme whenever none of the potentially requesting entities are currently making requests.

18. The apparatus of claim 17, wherein:

the computer resource is a video frame buffer having a serial access mode (SAM) port; and the potentially requesting entities include a system bus requestor, an expansion bus requestor, a video frame buffer refresh requestor, a primary SAM requestor and a secondary SAM requestor.

19. The apparatus of claim 16, wherein:

the means for providing the priority schemes includes means for providing first, second, third, fourth and fifth priority schemes in correspondence with, respectively, the system bus requestor, the expansion bus requestor, the primary SAM requestor, the secondary SAM requestor and the video frame buffer refresh requestor;

the first priority scheme designates, in the order of highest to lowest priority, the following relative priorities: the expansion bus requestor, the secondary SAM requestor, the primary SAM requestor, the video frame buffer refresh requestor and the system bus requestor;

the second priority scheme designates, in the order of highest to lowest priority, the following relative priorities: the secondary SAM requestor, the primary SAM requestor, the expansion bus requestor, the video frame buffer refresh requestor and the system bus requestor;

the third priority scheme designates, in the order of highest to lowest priority, the following relative priorities: the secondary SAM requestor, the expansion bus requestor, the video frame buffer refresh requestor, the system bus requestor and the primary SAM requestor;

the fourth priority scheme designates, in the order of highest to lowest priority, the following relative priorities: the primary SAM requestor, the expansion bus requestor, the video frame buffer refresh requestor, the system bus requestor and the secondary SAM requestor; and the fifth priority scheme designates, in the order of highest to lowest priority, the following relative priorities: the expansion bus requestor, the secondary SAM requestor, the primary SAM requestor, the system bus requestor and the video frame buffer refresh requestor.

20. The apparatus of claim 19, further comprising means for providing a default priority scheme that designates relative priority of the potentially requesting entities with respect to one another, and wherein:

the means for newly selecting one of the priority schemes as the current priority scheme further comprises means for selecting the default priority scheme as the current priority scheme whenever none of the potentially requesting entities are currently making requests; and the default priority scheme designates, in the order of highest to lowest priority, the following relative priorities: the system bus requestor, the expansion bus requestor, the secondary SAM requestor, the primary SAM requestor and the video frame buffer refresh requestor.

* * * * *